(12) United States Patent
Liu

(10) Patent No.: US 8,442,007 B2
(45) Date of Patent: May 14, 2013

(54) BEARER ESTABLISHING METHOD AND SYSTEM BASED ON HANDOVER

(75) Inventor: Lin Liu, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 184 days.

(21) Appl. No.: 12/922,171

(22) PCT Filed: Jul. 16, 2008

(86) PCT No.: PCT/CN2008/071661
§ 371 (c)(1),
(2), (4) Date: Sep. 11, 2010

(87) PCT Pub. No.: WO2009/111931
PCT Pub. Date: Sep. 17, 2009

(65) Prior Publication Data
US 2011/0002306 A1    Jan. 6, 2011

(30) Foreign Application Priority Data

Mar. 12, 2008 (CN) .......................... 2008 1 0007378

(51) Int. Cl.
*H04W 4/00* (2009.01)
(52) U.S. Cl.
USPC ........................................................ 370/331
(58) Field of Classification Search .................. 370/203, 370/204–215, 229–240, 310–337, 338–350, 370/395.1, 395.3, 395.4, 395.41, 395.42, 370/395.5, 395.52, 395.53, 412–421, 431–529, 370/523–520
See application file for complete search history.

(56) References Cited

U.S. PATENT DOCUMENTS

| 8,064,907 | B2 * | 11/2011 | Gallagher et al. | 455/435.1 |
| 8,085,731 | B2 * | 12/2011 | Zhao et al. | 370/331 |
| 8,134,974 | B2 * | 3/2012 | Chun et al. | 370/331 |
| 8,190,158 | B2 * | 5/2012 | Yang et al. | 455/436 |
| 8,228,868 | B2 * | 7/2012 | Lee et al. | 370/331 |
| 8,228,869 | B2 * | 7/2012 | Ahluwalia | 370/331 |
| 2007/0213060 | A1 * | 9/2007 | Shaheen | 455/436 |
| 2009/0040982 | A1 * | 2/2009 | Ho et al. | 370/331 |
| 2009/0129342 | A1 * | 5/2009 | Hwang et al. | 370/331 |
| 2010/0118781 | A1 * | 5/2010 | Petrovic et al. | 370/328 |

(Continued)

FOREIGN PATENT DOCUMENTS

| CN | 1574770 A | 2/2005 |
| CN | 101132640 A | 2/2008 |
| KR | 20020051698 A | 6/2002 |
| KR | 20030041662 A | 5/2003 |

OTHER PUBLICATIONS

P.R. China, State Intellectual Property Office, International Search Report for International Application No. PCT/CN2008/071661, mailed Dec. 4, 2008.

*Primary Examiner* — Jung-Jen Liu
(74) *Attorney, Agent, or Firm* — Bright IP Law Offices

(57) ABSTRACT

The present invention discloses a bearer establishing method and system based on handover, wherein the method comprises: an MME transmits the handover required message to the target base station, and carries aggregate maximum bit rate information, namely AMBR information of the UE in the handover required message. In virtue of the above technical scheme, the AMBR information is transmitted to the target base station through the interface S1-MME from the MME when the handover through the MME happens, so that the target base station can obtain the AMBR information and achieve the establishment of the bearers.

11 Claims, 3 Drawing Sheets

U.S. PATENT DOCUMENTS

| | | |
|---|---|---|
| 2011/0170517 A1* | 7/2011 | Bakker et al. .................. 370/331 |
| 2011/0171953 A1* | 7/2011 | Faccin et al. ............... 455/426.1 |
| 2011/0263274 A1* | 10/2011 | Fox et al. ................... 455/456.2 |
| 2012/0002545 A1* | 1/2012 | Watfa et al. ................... 370/235 |
| 2012/0076121 A1* | 3/2012 | Choi et al. .................... 370/338 |
| 2012/0184266 A1* | 7/2012 | Faccin et al. ............... 455/426.1 |

* cited by examiner

BEARER ESTABLISHING METHOD AND SYSTEM BASED ON HANDOVER

FIELD OF THE INVENTION

The present invention relates to the mobile communication field, in particular to a bearer establishing method and system based on handover between network elements.

BACKGROUND OF THE INVENTION

With the booming development of the World Interoperability for Microwave Access (Wimax), in order to maintain its strong competence in the mobile communication field, the 3rd Generation (3G) mobile communication system has to improve its the network performance and reduce the cost of network construction and operation.

Therefore, the standardization working group of the 3rd Generation Partnership Project (3GPP) is now dedicating on researching the evolution of the Packet Switch Core network (PS Core) and the Universal Mobile Telecommunication System Radio Access Network (UTRAN). The research topic is called as System Architecture Evolution (SAE) and Long Term Evolution (LTE) of the access network, wherein the evolved access network is called as the Evolved UTRAN (E-UTRAN).

The evolution of the network aims at providing a network completely based on IP with low delay, high data rate, high system capacity, high coverage and low cost. The evolved mobile communication system is called as the Evolved Packet System (EPS).

FIG. 1 shows the architecture of the E-UTRAN.

As shown in FIG. 1, the E-UTRAN consists of evolved nodes B (E-UTRAN NodeB, eNB for short), and provides radio resources for user access. The eNBs interact with one another through the interface X2. The eNB is connected to the Evolved Packet Core network (EPC) through the interface S1.

In the mobile communication system, services are provided by bearers. Different services correspond to different bearers, so that different service requirements can be met. In order to meet the requirements of the services, bearers have many attributes, such as speed rate, priority and so on. The bearer in the EPS system is defined as EPS bearer.

In the EPS system, the Aggregate Maximum Bit Rate (AMBR) is the maximum speed rate shared by a plurality of bearers of one user. When the other bearers are not transmitting data, any one of the bearers can use the entire AMBR. The AMBR restricts the total speed rate that can be provided by all the bearers sharing the AMBR. The eNB should distribute bandwidth for the bearers according to the AMBR, and should execute the control of the AMBR after the bearer establishment is completed. Upon establishing an EPS bearer, the core network determines whether the bearer shares an AMBR with other bearers according to the attributes of the bearer. Therefore, the Mobile Management Entity (MME) needs to bring the AMBR information of the UE to the eNB upon establishing the bearer.

For a handover through the MME, when the handover is performed from a source eNB to a target eNB, the target eNB also needs to establish a bearer. However, according to the currently used handover method, the target eNB does not know the AMBR information of the UE, so the target eNB can not establish a bearer correctly.

SUMMARY OF THE PRESENT INVENTION

The present invention is proposed in consideration of the following problem existed in the related technology, namely, for a handover through the MME, when handover is performed from a source eNB to a target eNB, the target eNB can not establish a bearer correctly because the AMBR information of the UE is unknown for the target eNB. To this end, the present invention aims at providing a bearer establishing method and a system based on handover so as to solve the above problem existed in the related technology.

In order to achieve the above-mentioned aim, the present invention provides a bearer establishing method based on handover according to one aspect of the present invention.

The bearer establishing method based on handover according to the embodiment of the present invention, used for a target base station to establish a bearer for a user equipment, UE, when the UE is handed over from a source base station to the target base station; the source base station initiating a handover required message to an MME to request to hand over to the target base station; the MME transmitting the handover required message to the target base station, and carrying bearer establishment information in the handover required message, the MME transmits the handover required message to the target base station, and carries aggregate maximum bit rate information, namely AMBR information, of the UE in the handover required message.

Wherein the target base station establishes one or more bearers, and the sum of the bandwidth of the Non-Guaranteed Bit Rate (Non-GBR) bearers is less than or equal to the value of the AMBR information.

Wherein the target base station returns a handover required response message to the MME after the target base station establishes the bearer.

The present invention provides a bearer establishing method based on handover according to another aspect of the present invention. The method is used for a target base station to establish a bearer for a UE when the UE is handed over from a source base station to the target base station.

In the bearer establishing method according to the embodiment of the present invention, the source base station initiates a handover required message to a source MME to request to hand over to the target base station; the source MME forwards the handover required message to a target MME; the target MME transmits the handover required message to the target base station, and carries bearer establishment information and aggregation maximum bit rate information, namely AMBR information, of the UE in the handover required message; the target base station distributes bandwidth according to the AMBR information, and establishes a bearer for the UE according to the bearer establishment information.

Wherein the target base station establishes one or more bearers, and the sum of the bandwidth of the Non-Guaranteed Bit Rate bearers is less than or equal to the value of the AMBR information.

Wherein the target base station returns a handover required response message to the MME after the target base station establishes the bearer.

The present invention provides a bearer establishing system based on handover according to another aspect of the present invention.

The system comprises a source base station, a target base station and an MME, wherein the MME is configured to forward a handover required message transmitted from the source base station to the target base station, and to carry bearer establishment information in the handover required message.

In the bearer establishing system based on handover according to the embodiment of the present invention, the MME carries aggregate maximum bit rate information, namely AMBR information, of the UE in the handover required message.

Wherein the target base station is configured to establish one or more bearers, and the sum of the bandwidth of the Non-Guaranteed Bit Rate bearers is less than or equal to the value of the AMBR information.

Wherein the target base station is configured to return a handover required response message to the MME after the target base station establishes the bearer.

Wherein the system is used for establishing a bearer for a UE which is handed over from a source base station to a target base station. In the system, the source base station comprises a handover requesting module which is configured to transmit the handover required message to the MME; the MME comprises a message processing module which is configured to process the received handover required message, and to transmit, through the handover required message, bearer establishment information and AMBR information of the UE to the target base station; and the target base station comprises a bearer establishing module which is configured to distribute bandwidth according to the AMBR information in the handover required message received by the target base station, and to establish a bearer according to the bearer establishment information.

Wherein the bearer establishing module is configured to establish one or more bearers, and the sum of the bandwidth of the Non-Guaranteed Bit Rate bearers is less than or equal to the value of the AMBR information.

Wherein the target base station further comprises: a handover responding module, configured to return a handover required response message to the MME after the bearer establishing module establishes the bearer.

In virtue of at least one of above-mentioned technical schemes of the present invention, the following beneficial effects are achieved: the AMBR information is transmitted to the target base station through the interface S1-MME from the MME when a handover through the MME happens, so that the target base station can obtain the AMBR information and achieve the establishment of the bearer.

Other features and advantages of the present invention will be described in the following description and partly become obvious from the description, or be understood by implementing the present invention. The objects and other advantages of the present invention can be realized and obtained through the structures indicated in the description, claims and drawings.

BRIEF DESCRIPTION OF THE DRAWINGS

The drawings provide a further understanding of the present invention and form a part of the specification. The drawings are used to explain the present invention together with the embodiments of the present invention without unduly limiting the scope of the present invention, wherein.

DETAILED DESCRIPTION OF EMBODIMENTS

As mentioned above, for a handover through an MME, the target base station does not know the AMBR information of the UE at present, so the bearer can not be established correctly. For this reason, the present invention provides a bearer establishing method and system based on handover which ensure the MME to bring the AMBR information to the target base station in a handover message.

The preferable embodiments of the present invention will be detailed hereinafter in connection with the drawings. What should be understood is that the preferable embodiments detailed hereinafter are used for illustration only, and thus are not limitative of the present invention.

Method Embodiments

The present invention provides a bearer establishing method based on handover according to an embodiment of the present invention. The method is used for a target base station to establish a bearer for a UE when the UE is handed over from a source base station to the target base station; the source base station initiates a handover required message to an MME to request to hand over to the target base station, and the MME transmits the handover required message to the target base station and carries bearer establishment information in the handover required message.

The bearer establishing method based on handover according to the embodiment of the present invention comprises: the MME transmits the handover required message to the target base station, and carries aggregate maximum bit rate information, namely AMBR information, of the UE in the handover required message.

Figure 2:
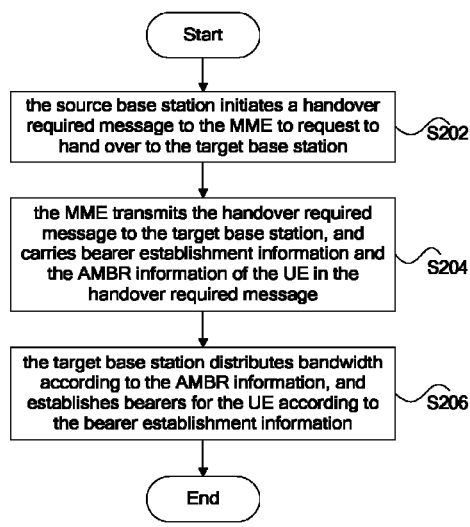
FIG. 2 is a flowchart of the bearer establishing method based on handover according to an embodiment of the present invention.

The technical scheme will be detailed hereinafter in connection with the drawings. FIG. 2 is a flowchart showing the method. As shown in FIG. 2, the method generally comprises the following steps:

S202, the source base station initiates a handover required message to the MME to request to hand over to the target base station;

S204, the MME transmits the handover required message to the target base station, and carries bearer establishment information and the AMBR information of the UE in the handover required message;

S206, the target base station distributes bandwidth according to the AMBR information, and establishes a bearer for the UE according to the bearer establishment information; specifically, the sum of the bandwidth of the Non-Guaranteed Bit Rate (Non-GBR) bearers is less than or equal to the value of the AMBR information.

Figure 3:
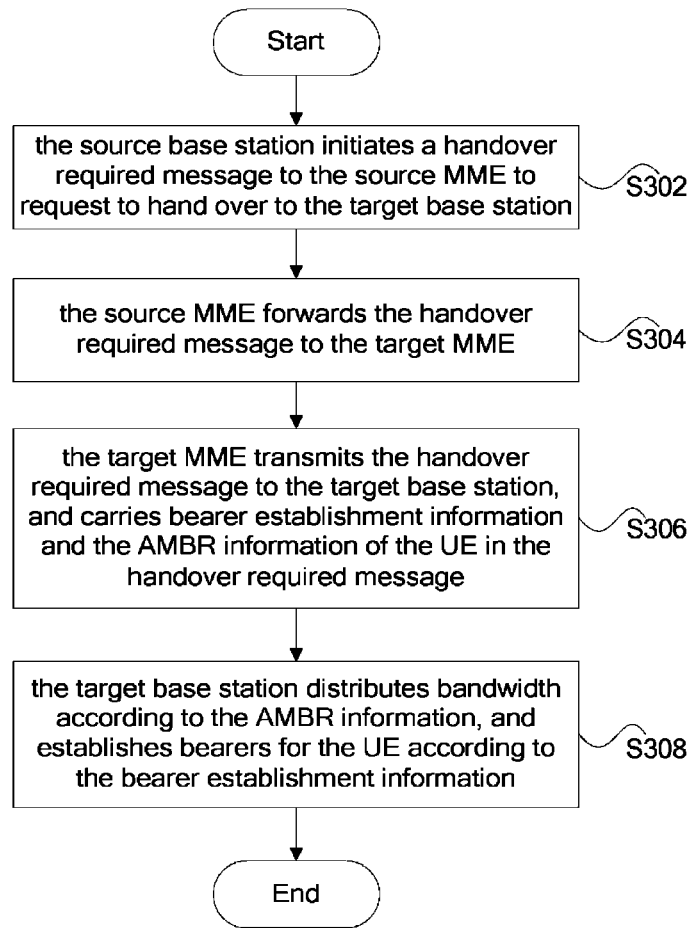
FIG. 3 is a flowchart of the bearer establishing method based on handover according to another embodiment of the present invention.

The present invention also provides another bearer establishing method based on handover according to the embodiment of the present invention. The method is used for a target base station to establish a bearer for a UE when the UE is handed over from a source base station to the target base station. FIG. 3 is a flowchart showing the method. As shown in FIG. 3, the method generally comprises the following steps:

S302, the source base station initiates a handover required message to the source MME to request to hand over to the target base station;

S304, the source MME forwards the handover required message to the target MME;

S306, the target MME transmits the handover required message to the target base station, and carries bearer establishment information and the AMBR information of the UE in the handover required message;

S308, the target base station distributes bandwidth according to the AMBR information, and establishes a bearer for the UE according to the bearer establishment information; specifically, the sum of the bandwidth of the Non-Guaranteed Bit Rate (Non-GBR) bearers is less than or equal to the value of the AMBR information.

Figure 4:
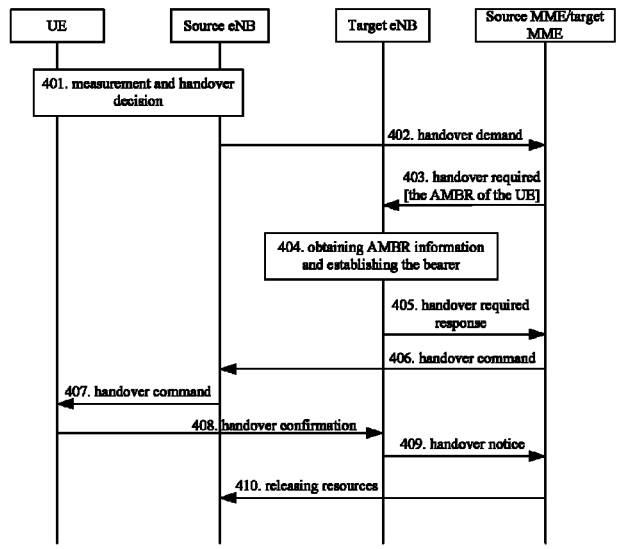
FIG. 4 is a flowchart of the detailed implementation manner of the method as shown in FIG. 2 or FIG. 3.

One embodiment of the above-mentioned methods is given hereinafter in connection with FIG. 4. What needs to be explained is that in the embodiment shown in FIG. 4, the source MME and target MME are shown in one block. As shown in FIG. 4, the method for implementing the present invention comprises the following steps:

401, the source eNB makes a handover decision according to a measurement report of a UE, and decides to initiate a handover between the MMEs;

402, the source eNB initiates a handover required message to the MME; if the MME is the source MME, the source MME needs to forward the handover required message to the target MME;

403, the (target) MME transmits the handover required message to the target eNB through the interface S1-MME, and carries the information of the bearer which needs to be established in the message, and also brings the AMBR information of the UE to the target eNB at the same time;

404, the target eNB obtains the information of the bearer which needs to be established and the AMBR information of the UE, and establishes a bearer according to the above information;

405, the target eNB returns a handover required response message to the MME;

406, the MME initiates a handover command to the source eNB;

407, the source eNB initiates the handover command to the UE;

408, after being handed over to the target cell, the UE transmits a handover acknowledge message to the target eNB;

409, the target eNB initiates a handover notification to the MME to notify the MME that the UE handover has been completed;

410, the MME transmits a resource release message to the source eNB; the source eNB releases related resources, and the handover is completed.

As can be seen from the above description, the AMBR information of the UE is transmitted to the eNB through the interface S1-MME from the MME at network side during handover, so that the target eNB can obtain the AMBR information and achieve the establishment of the bearer.

System Embodiment

The present invention provides a bearer establishing system based on handover according to an embodiment of the present invention. The system comprises a source base station (source eNB), a target base station (target eNB) and a mobile management entity (MME), wherein the MME is used for forwarding a handover required message transmitted from the source base station to the target base station.

Figure 1:
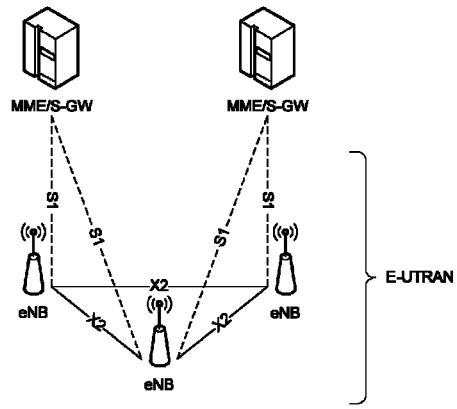
FIG. 1 is a schematic diagram of the E-UTRAN system according to the related technology.

Furthermore, the MME carries bearer establishment information and the AMBR information of the UE in the handover required message; the target base station distributes bandwidth according to the AMBR information in the received handover required message, and establishes a bearer according to the bearer establishment information in the handover required message. The system can be understood with reference to the system as shown in FIG. 1.

The present invention also provides another bearer establishing system based on handover according to an embodiment of the present invention. The system is used for establishing a bearer for a UE which is handed over from a source base station to a target base station, wherein the source base station and the target base station are respectively connected to the MME through the interface S1.

Figure 5:
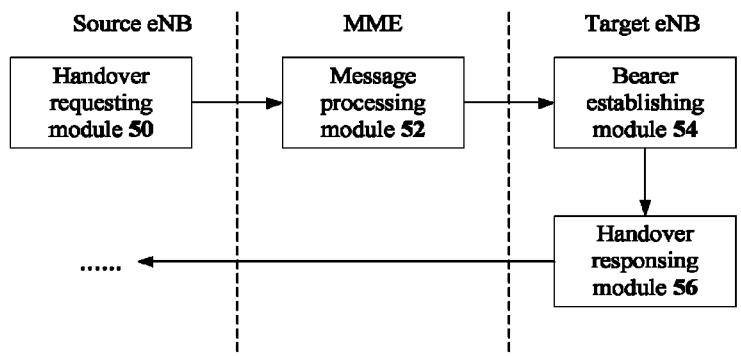
FIG. 5 is a structural diagram of the bearer establishing system based on handover according to an embodiment of the present invention.

As shown in FIG. 5, the bearer establishing system based on handover according to the embodiment of the present invention comprises: a handover requesting module 50, which is located in the source base station and is configured to transmit a handover required message to an MME; a message processing module 52, which is located in the MME, and is configured to process the received handover required message, to carry bearer establishment information and the AMBR information of the UE in the handover required message, and afterwards to transmit the handover required message to the target base station; a bearer establishing module 54, which is located in the target base station, and is configured to distribute bandwidth according to the AMBR information in the handover required message received by the target base station, and to establish a bearer according to the bearer establishment information.

Preferably, as shown in the dotted line block in FIG. 5, the system may further comprise a handover responding module 56, which is located in the target base station, and is configured to return a handover required response message to the MME after the bearer establishing module 54 establishes the bearers.

As mentioned above, in virtue of at least one of above-mentioned technical schemes of the present invention, the AMBR information is transmitted to the target base station through the interface S1-MME from the MME when the handover through the MME happens, so that the target base station can obtain the AMBR information and achieve the establishment of the bearer.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

The invention claimed is:

1. A bearer establishing method based on handover, used for a target base station to establish a bearer for a user equipment, UE, when the UE is handed over from a source base station to the target base station, comprising:

the source base station initiating a handover required message to a mobile management entity, MME, to request to hand over to the target base station;

the MME transmitting the handover required message to the target base station, and carrying bearer establishment information and aggregate maximum bit rate information, namely AMBR information, of the UE in the handover required message; and the target base station establishing one or more bearers, wherein sum of bandwidth of Non-Guaranteed Bit Rate bearers is no greater than value of the AMBR information.

2. A bearer establishing method based on handover, used for a target base station to establish a bearer for a user equipment, UE, when the UE is handed over from a source base station to the target base station, comprising:

the source base station initiating a handover required message to a source mobile management entity, MME, to request to hand over to the target base station;

the source MME forwarding the handover required message to a target MME;

the target MME transmitting the handover required message to the target base station, and carrying bearer establishment information and aggregation maximum bit rate information, namely AMBR information, of the UE in the handover required message; and the target base station distributing bandwidth according to the AMBR information, and establishing one or more bearers for the UE according to the bearer establishment information, wherein sum of bandwidth of Non-Guaranteed Bit Rate bearers is no greater than value of the AMBR information.

3. A bearer establishing system based on handover, comprising:

a source base station, wherein the source base station is configured to initiate a handover required message to a mobile management entity, MME, to request to hand over a user equipment from the source base station to a target base station;

the target base station; and the mobile management entity, MME, wherein the MME is configured to forward the handover required message transmitted from the source base station to the target base station, and to carry bearer establishment information and aggregate maximum bit rate information, namely AMBR information, of the UE in the handover required message;

wherein the target base station is configured to establish one or more bearers, wherein sum of bandwidth of Non-Guaranteed Bit Rate bearers is no greater than value of the AMBR information.

4. The system according to claim 3, wherein the source base station comprises a handover requesting module which is configured to transmit the handover required message to the MME;

the MME comprises a message processing module which is configured to process the received handover required message, and to transmit, through the handover required message, bearer establishment information and AMBR information of the UE to the target base station; and the target base station comprises a bearer establishing module which is configured to distribute bandwidth according to the AMBR information in the handover required message received by the target base station, and to establish a bearer according to the bearer establishment information.

5. The method according to claim 1, wherein the target base station returns a handover required response message to the MME after the target base station establishes the bearer.

6. The method according to claim 1, wherein the target base station returns a handover required response message to the MME after the target base station establishes the bearer.

7. The method according to claim 2, wherein the target base station returns a handover required response message to the MME after the target base station establishes the bearer.

8. The system according to claim 3, wherein the target base station is configured to return a handover required response message to the MME after the target base station establishes the bearer.

9. The system according to claim 4, wherein the bearer establishing module is configured to establish one or more bearers, and the sum of the bandwidth of the Non-Guaranteed Bit Rate bearers is less than or equal to the value of the AMBR information.

10. The system according to claim 4, wherein the target base station further comprises:

a handover responding module, configured to return a handover required response message to the MME after the bearer establishing module establishes the bearer.

11. The system according to claim 9, wherein the target base station further comprises:

a handover responding module, configured to return a handover required response message to the MME after the bearer establishing module establishes the bearer.

* * * * *